Figure 1:
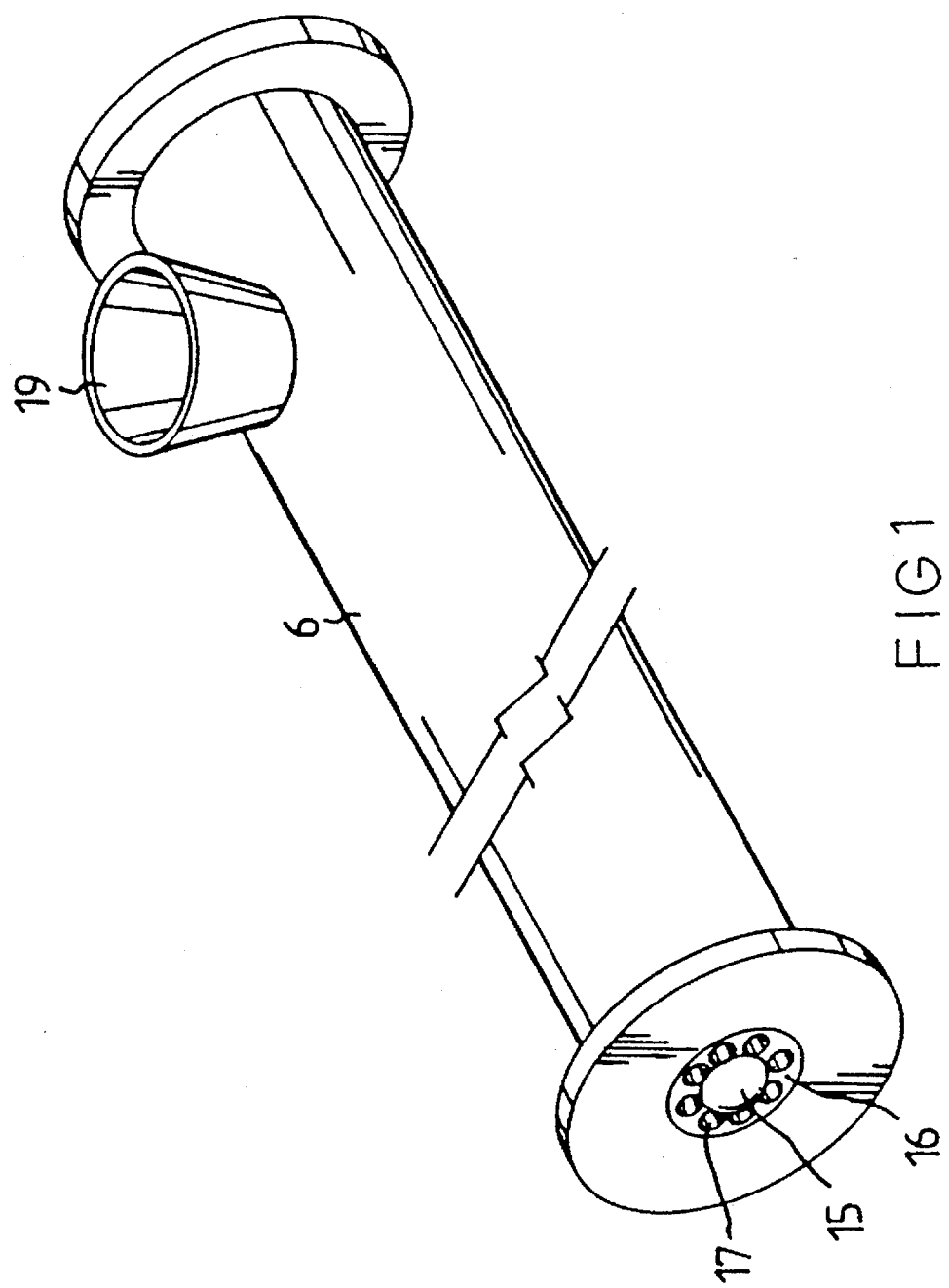

United States Patent [19]
Lin

[11] Patent Number: 5,573,331
[45] Date of Patent: Nov. 12, 1996

[54] MULTIPLE-STAGE SCREW FOR BLENDING MATERIALS

[76] Inventor: Ping H. Lin, No. 2, Alley 54, Lane 747, Chung Cheng Pei Rd., Young Kang, Tainan, Taiwan

[21] Appl. No.: 525,052

[22] Filed: Sep. 8, 1995

[51] Int. Cl.⁶ .................................. B29B 7/42; B01F 7/08
[52] U.S. Cl. ................................ 366/81; 366/82
[58] Field of Search .................. 366/79–82, 89, 366/90, 318, 319, 324; 425/208, 209, 562–564, 190, 192 R, 382 R

[56] References Cited

U.S. PATENT DOCUMENTS

| | | | |
|---|---|---|---|
| 2,453,088 | 11/1948 | Dulmage | 366/82 |
| 2,753,595 | 7/1956 | Dulmage | 425/208 X |
| 2,838,794 | 6/1958 | Munger et al. | 366/81 |
| 3,006,029 | 10/1961 | Saxton | 366/89 |
| 3,788,612 | 1/1974 | Dray | 366/81 |
| 3,957,256 | 5/1976 | Murakami | 366/81 |
| 4,659,230 | 4/1987 | Son et al. | 366/81 X |
| 5,013,233 | 5/1991 | Semmekrot | 425/208 |
| 5,297,948 | 3/1994 | Sadr | 425/208 |
| 5,449,484 | 9/1995 | Gusik et al. | 425/208 X |

FOREIGN PATENT DOCUMENTS

| | | | |
|---|---|---|---|
| 69271 | 1/1983 | European Pat. Off. | 425/208 |
| 52856 | 1/1977 | Japan | 366/81 |

*Primary Examiner*—Charles E. Cooley
*Attorney, Agent, or Firm*—Pro-Techtor International

[57] ABSTRACT

A multiple-stage extruder for mixing and extruding plastic. A central area of the screw includes a first blending area that has several obliquely positioned grooves. A second blending area includes a plurality of round protrusions. Both ends of the screw are supported in a main body to prevent vibration of the unit.

2 Claims, 4 Drawing Sheets

MULTIPLE-STAGE SCREW FOR BLENDING MATERIALS

(A) BACKGROUND OF THE INVENTION

The present invention relates to a multiple-stage blending screw with a unique configuration, which is suitable for transporting plastic raw materials in an extruder for plastic molding as well as for thoroughly blending the plastic raw materials, so that the quality of the extruded plastic material is uniform and suitable for the manufacture of high-quality products.

A conventional plastic extruder consists typically of a main body and a screw, which are configured in such a manner that the threads of the screw come into contact with the inner surface of the main body. When a plastic raw material is fed into an inlet to the main body while the screw is turning, the plastic raw material gathered in the valley of the screw, is being pushed forward and extruded by the rotation of the screw. However, this configuration is subject to the following drawbacks:

(1) Since the plastic raw material accumulates in the valleys of the screw and is then pushed forward by the screw's rotation without any mixing action, the plastic raw material is not properly blended. As a result, the plastic raw material so extruded lacks uniformity, which affects the quality of the resulting injection plastic products.

(2) Since the front of the screw comes into contact with the main body at an oblique angle, the supporting point varies, thereby bringing about a certain degree of deviation from the center of gravity. As the screw rotates, which sends the plastic raw material forward, the back pressure causes the pressure at the front end to become uneven. As a result, the friction at the front end increases substantially; this damages the inner wall of the main body, causes the raw material to be extruded unevenly, and reduces the amount of raw material being extruded.

(B) SUMMARY

The present invention relates to a multiple-stage blending screw with a unique configuration, which is aimed at solving the problems inherent in the fact that screws used in conventional plastic extruders are capable of only transporting the plastic raw materials, without thoroughly blending them. This is responsible for the inconsistent product quality of the materials to be extruded and, consequently, of the final products as well. The following improvements are realized by the use of the multiple-stage blending screw of the present invention:

(1) The multiple-stage blending screw is equipped with a first-stage mixing shaft and a second-stage mixing shaft. As a result, a non-uniform plastic raw material being fed into the extruder can be blended thoroughly, thereby producing an extruding plastic raw material of consistent high quality. This, in turn, leads to extrusion molded products of consistently excellent quality.

(2) One end of the screw of the present invention is mounted onto a gear wheel and the other end is equipped with a circular disc. With this configuration, the center of gravity does not deviate as the screw rotates. Since one end of the screw is supported by a gear wheel and the other end is supported by a circular disc, the friction between the thread of the screw and the inner surface of the main body is reduced, and vibration caused by deviations from the center of gravity is eliminated. As a result, stabilizing effects and excellent durability can be realized.

(C) BRIEF DESCRIPTION OF THE DRAWINGS

FIG. 1: A three-dimensional drawing of the multiple-stage blending screw of the present invention.

Figure 2:
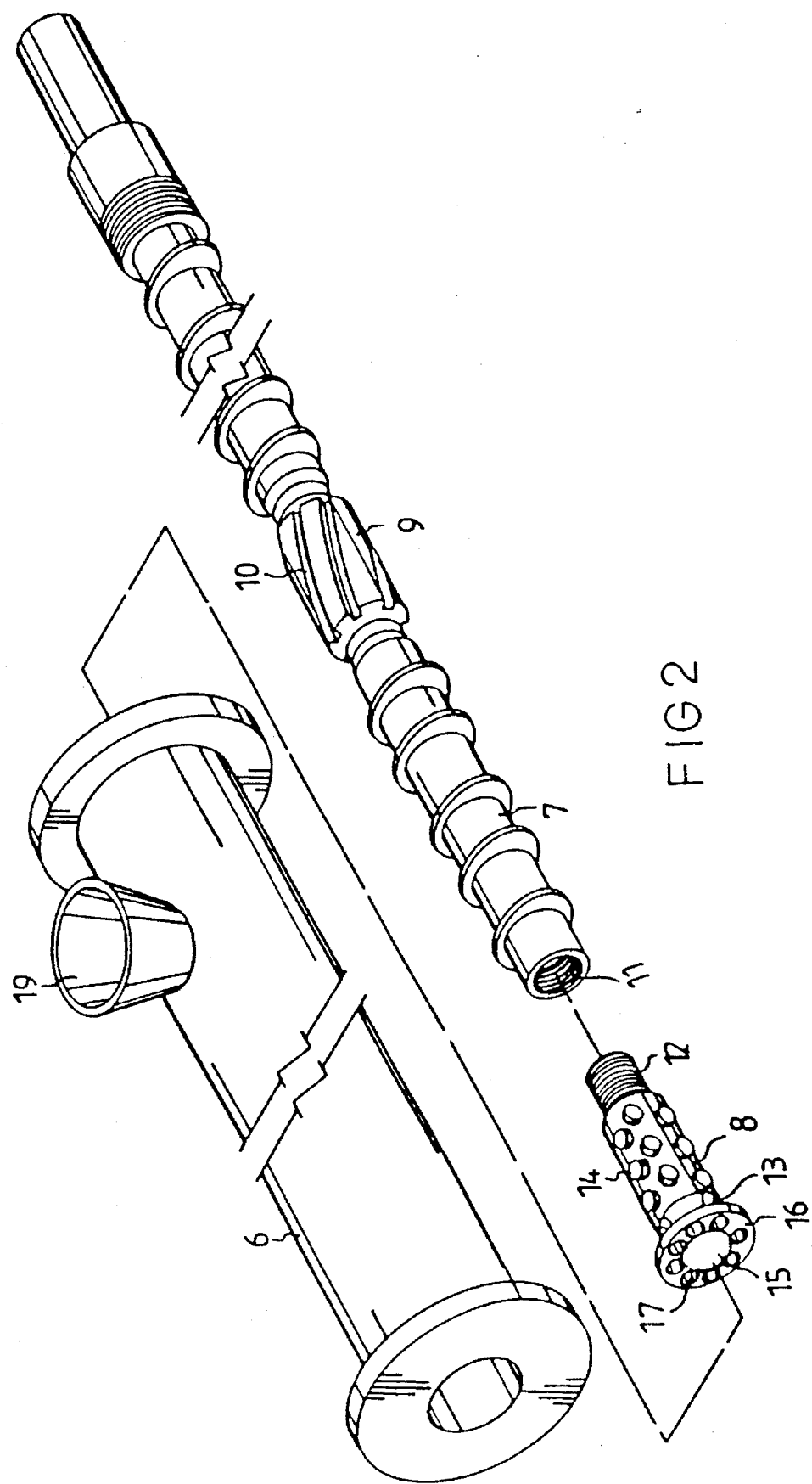

FIG. 2: A three-dimensional dissection drawing of the multiple-stage blending screw of the present invention.

Figure 3:
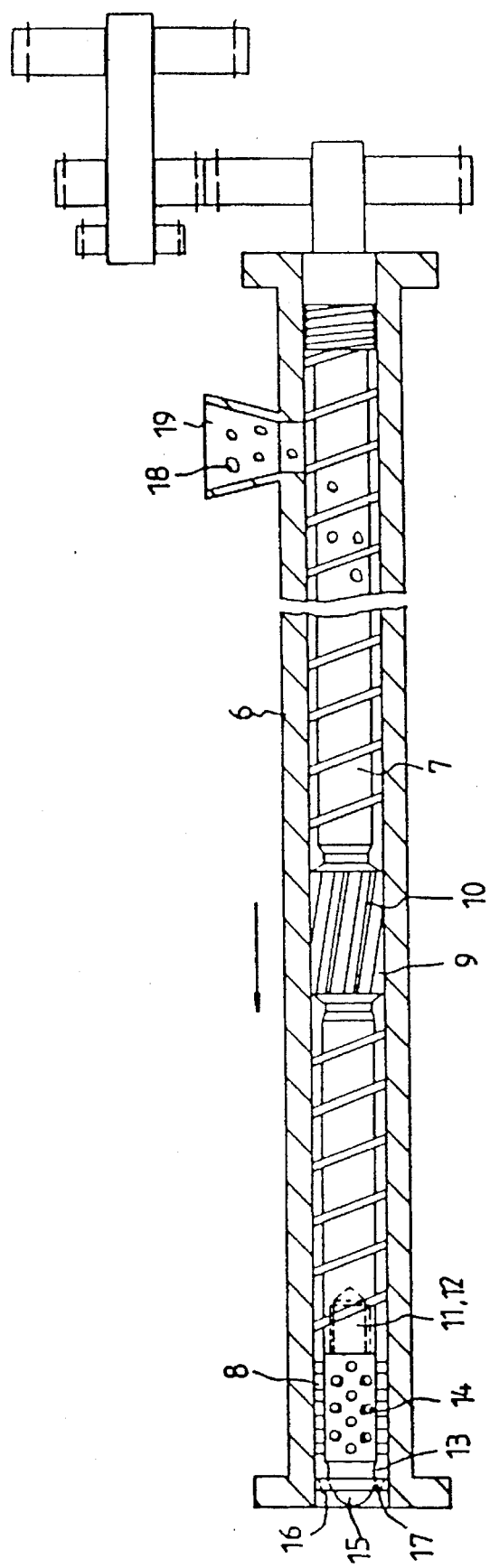

FIG. 3: A cross-sectional drawing of the multiple-stage blending screw of the present invention.

Figure 4:
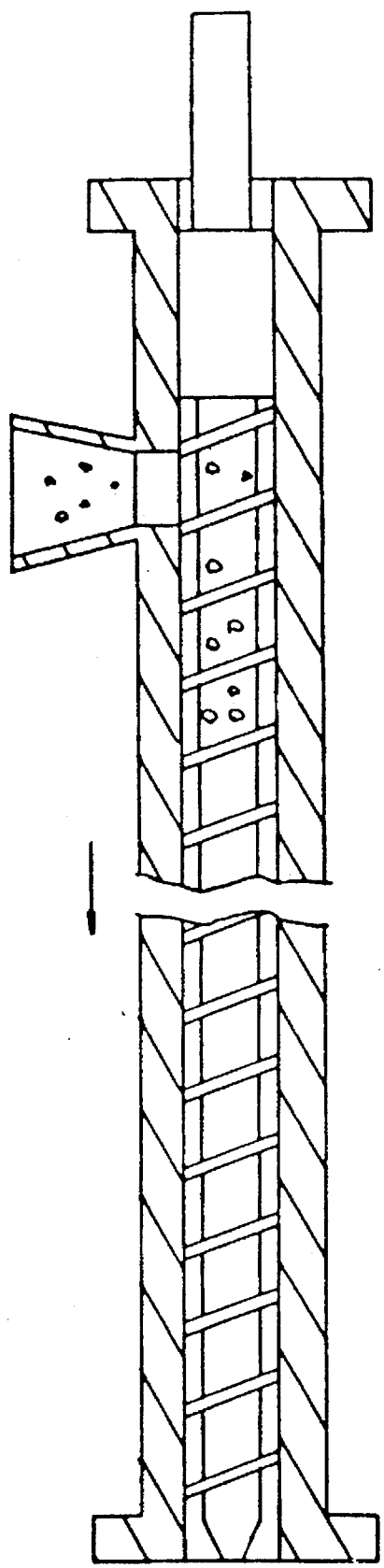

FIG. 4: A cross-sectional drawing of a conventional screw.

(D) DESCRIPTION OF THE PREFERRED EMBODIMENT(S)

As shown in FIGS. 2 and 3, the multiple-stage blending screw of the present invention consists of a screw 7 and a second-stage blending shaft 8. The structure of screw 7 is as follows: the middle part of screw 7 is equipped with an appropriately located first-stage blending shaft 9, the circumferential surface of which is equipped with several obliquely positioned grooves 10, and the part of screw 7 to be connected to the second-stage blending shaft 8 is equipped with inner threads 11 and can be screwed onto a threaded male connecting rod 12 on one end of the second-stage blending shaft 8. The structure of the second-stage blending shaft 8 is as follows: The second-stage blending shaft 8 is of an one-piece design; the part next to the threaded male connecting rod 12 is equipped with a number of irregularly positioned round protruding pieces 14, while the other side of the section equipped with said round protruding pieces 14 is equipped with an O-ring-like recessing groove 13, the other end of said O-ring-shaped recessing groove 13 being equipped with an O-ring-shaped protruding flange 15, the outer side of which is equipped with a supporting disc 16, all of these components being molded as a single-piece structure. The supporting disc 16 is equipped with a number of extruding openings 17 connected to the protruding flange 15. After screw 7 and the second-stage blending shaft 8 are fastened together by means of screwing, the resulting screw assembly is installed into the main body 6 of an extruder. The outer circumferential surface of screw 7 is then in contact with the inner surface of main body 6. As shown in FIG. 3, during operation, a plastic raw material 18 is fed into an inlet 19 and is caused to move forward by the rotating screw 7. Upon arriving at the first-stage blending shaft 9, the plastic pellets are funneled into the obliquely positioned grooves 10. Since the obliquely positioned grooves 10 have a different configuration than the first-stage blending shaft 9, the positioning of the plastic raw material 18 is altered, thus providing the first blending step. After the first blending step, the plastic raw material 18 is caused to move forward by the rotating screw 7 into the second-stage blending shaft 8, and the rotating irregularly positioned round protruding pieces 14 on the second-stage blending shaft 8 cause the plastic raw material 18 to move along the gaps between the individual round protruding pieces 14. This constitutes the second blending step. After mixing, the plastic raw material 18 is extruded through openings 17 on the supporting disc 16 into a mold for molding.

I claim:

1. A multiple-stage extruder comprising:

a main body and a screw, said screw includes at a middle part a first-stage blending shaft, said first-stage blending shaft includes on a circumferential surface thereof a plurality of obliquely positioned grooves, a part of the screw that connects to a second-stage blending shaft includes inner threads to receive a threaded male connecting rod at a first end of said second-stage blending shaft, said second-stage blending shaft comprises a unitary body, a portion of said second-stage blending shaft adjacent to said connecting rod includes a plurality of irregularly positioned round protrusions, said second-stage blending shaft includes a recessed groove near a second end of said second-stage blending shaft, said second end of said second-stage blending shaft includes a protruding flange, an outer side of which includes a supporting disk, said flange further including a plurality of openings.

2. The multiple-stage blending unit of claim 1 wherein:

a circumference of said supporting disk of said second-stage blending shaft contacts an inner wall of said main body to support a terminal end of said shaft.

* * * * *